US012680892B2

(12) United States Patent
Kinjo

(10) Patent No.: US 12,680,892 B2
(45) Date of Patent: Jul. 14, 2026

(54) FORCE SENSOR

(71) Applicant: Japan Display Inc., Tokyo (JP)

(72) Inventor: Hiroumi Kinjo, Tokyo (JP)

(73) Assignee: Japan Display Inc., Tokyo (JP)

( * ) Notice: Subject to any disclaimer, the term of this patent is extended or adjusted under 35 U.S.C. 154(b) by 423 days.

(21) Appl. No.: 18/197,433

(22) Filed: May 15, 2023

(65) Prior Publication Data

US 2023/0375421 A1     Nov. 23, 2023

(30) Foreign Application Priority Data

May 20, 2022     (JP) ................................. 2022-083058

(51) Int. Cl.
*G01L 1/20* (2006.01)
(52) U.S. Cl.
CPC .................................... *G01L 1/205* (2013.01)
(58) Field of Classification Search
CPC ........... G01L 1/205; G06F 2203/04103; G06F 3/04144; G06F 3/04166
USPC ........................................................... 702/41
See application file for complete search history.

(56) References Cited

U.S. PATENT DOCUMENTS

2007/0052690 A1* 3/2007 Roberts ................. G06F 3/0418
345/173
2016/0062517 A1* 3/2016 Meyer ................. G06F 3/04144
29/829

2019/0015702 A1* 1/2019 Krebs ..................... B66C 13/06
2022/0034738 A1 2/2022 Wu et al.
2024/0210260 A1* 6/2024 Lu ............................. G01L 1/16

FOREIGN PATENT DOCUMENTS

JP          2018146489 A          9/2018

OTHER PUBLICATIONS

Office Action issued in related Japanese Patent Application No. 2022-083058 on Mar. 10, 2026 and English translation of same. 6 pages.

* cited by examiner

*Primary Examiner* — Andrew Schechter
*Assistant Examiner* — Joshua L Forristall
(74) *Attorney, Agent, or Firm* — K&L Gates LLP

(57) ABSTRACT

A force sensor includes an input surface that is pressed, and a first sensor and a second sensor stacked in order in a force direction with respect to the input surface. The input surface has a detection region in which force is detected, one of the first sensor and the second sensor is a force distribution sensor having a plurality of individual detection regions dividing the detection region and configured to detect the force input to the individual detection regions, and the other of the first sensor and the second sensor is a force sensor having a comprehensive detection region overlapping at least two or more of the individual detection regions and configured to detect the force input to the comprehensive detection region.

6 Claims, 19 Drawing Sheets

FORCE SENSOR

CROSS-REFERENCE TO RELATED APPLICATION

This application claims the benefit of priority from Japanese Patent Application No. 2022-083058 filed on May 20, 2022, the entire contents of which are incorporated herein by reference.

BACKGROUND

1. Technical Field

The present disclosure relates to a force sensor.

2. Description of the Related Art

As described in Japanese Patent Application Laid-open Publication No. 2018-146489 (JP-A-2018-146489), a force sensor includes an array substrate provided with a plurality of array electrodes. A detection region of the force sensor is divided into a plurality of individual detection regions corresponding to the array electrodes. When part of the detection region is pressed, the force is detected not in one individual detection region but in a plurality of individual detection regions due to the high spatial resolution of recent force sensors. This mechanism can obtain force distribution indicating the distribution of force values acting on each individual detection region.

The force sensor described in JP-A-2018-146489 fails to detect force input between the array electrodes. Various sensor layers are used for the force sensor, including a force-sensitive layer the resistance of which decreases as the contact area increases. The use of such a force-sensitive layer causes hysteresis, which makes the force values detected in the individual detection regions unreliable. As a result, the whole load value fails to be accurately derived by adding up the force values detected in the respective individual detection regions.

An object of the present disclosure is to provide a force sensor that can detect the force value acting on each individual detection region and accurately detect the whole load value.

SUMMARY

A force sensor according to an embodiment of the present disclosure includes an input surface that is pressed, and a first sensor and a second sensor stacked in order in a force direction with respect to the input surface. The input surface has a detection region in which force is detected, one of the first sensor and the second sensor is a force distribution sensor having a plurality of individual detection regions dividing the detection region and configured to detect the force input to the individual detection regions, and the other of the first sensor and the second sensor is a force sensor having a comprehensive detection region overlapping at least two or more of the individual detection regions and configured to detect the force input to the comprehensive detection region.

BRIEF DESCRIPTION OF THE DRAWINGS

FIG. 4 is a sectional view of a state where force is input to the force sensor according to the first embodiment;

DETAILED DESCRIPTION

Figure 1:
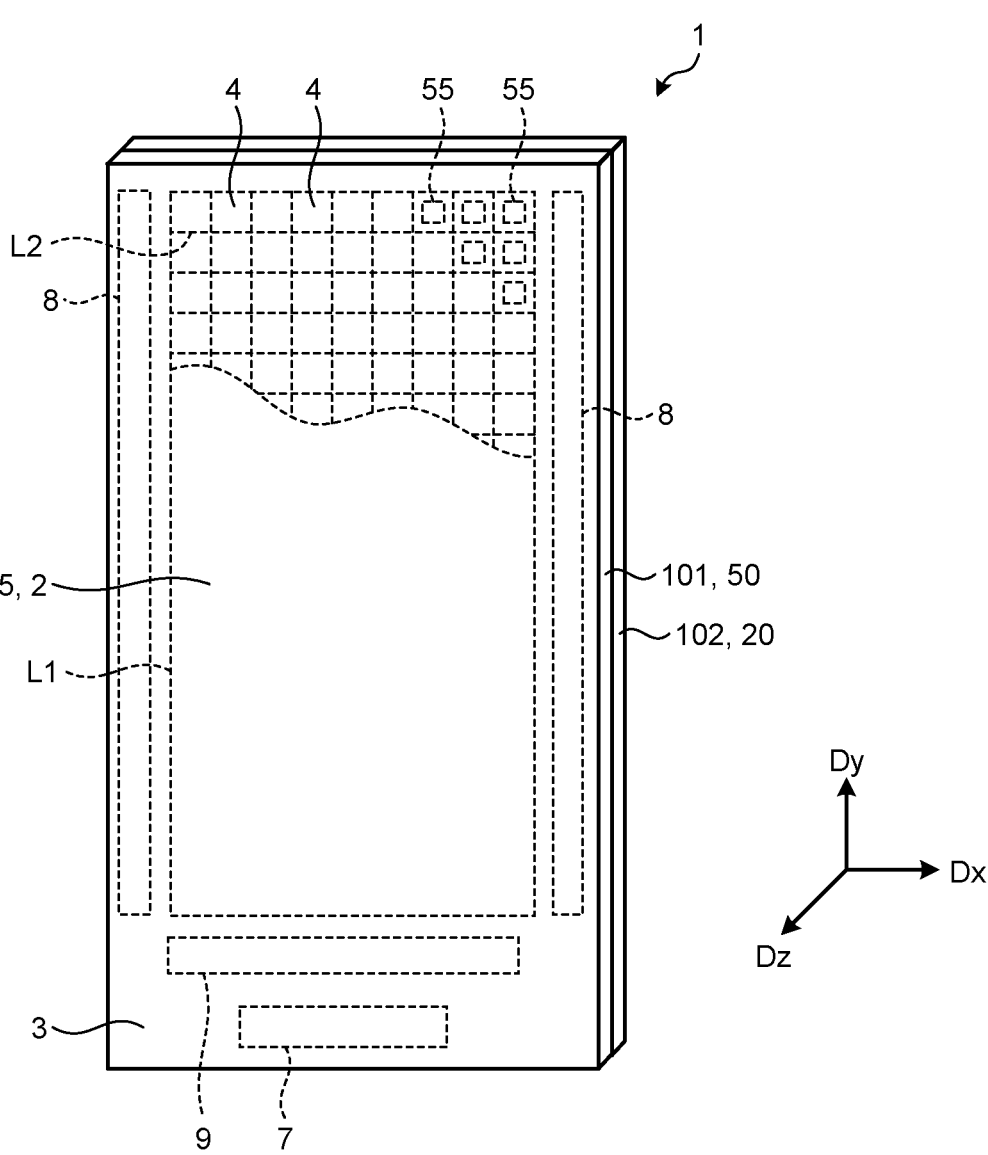
FIG. 1 is a perspective view schematically illustrating a force sensor according to a first embodiment.

Exemplary aspects (embodiments) to embody a force sensor according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than those in the actual aspect. These elements, however, are given by way of example only and are not intended to limit interpretation of the present disclosure. In the present specification and the drawings, components similar to those previously described with reference to previous drawings are denoted by like reference numerals, and detailed explanation thereof may be appropriately omitted.

To describe an aspect regarding a certain structure on which another structure is disposed in the present specification and the claims, when "on" is simply used, it indicates both the following cases unless otherwise noted: a case where the other structure is disposed directly on and in contact with the certain structure, and a case where the other structure is disposed on the certain structure with yet another structure interposed therebetween.

First Embodiment

FIG. 1 is a perspective view schematically illustrating a force sensor according to a first embodiment. A force sensor 1 is a device that detects force acting on an input surface 1$a$. As illustrated in FIG. 1, the force sensor 1 has a flat plate shape. One surface of the force sensor 1 is the input surface 1$a$ to which force is input. The force sensor 1 has an oblong (rectangular) shape. The input surface 1$a$ is divided into a detection region 2 in which force can be detected and a peripheral region 3 surrounding the detection region 2. In FIG. 1, a boundary line L1 is drawn to make the boundary between the detection region 2 and the peripheral region 3 easy to understand. In the following description, the direction normal to the input surface 1$a$ and the same as the direction of the force acting on the force sensor 1 is referred to as a force direction A1 (refer to FIG. 2).

The force sensor 1 includes the input surface 1$a$, and a first sensor 101 and a second sensor 102 stacked in order in the force direction A1 (refer to FIG. 2) with respect to the input surface 1$a$.

The first sensor 101 is a force distribution sensor 50. The force distribution sensor 50 is a device that detects force input to a plurality of individual detection regions 4 dividing the detection region 2. In FIG. 1, boundary lines L2 are drawn to make the boundaries between the individual detection regions 4 easy to understand.

The individual detection regions 4 are arrayed in a first direction Dx and a second direction Dy. The first direction Dx is a direction parallel to the input surface 1$a$. The second direction Dy is a direction parallel to the input surface 1$a$ and intersecting the first direction Dx. The first direction Dx according to the present embodiment is a direction parallel to the short side of the force sensor 1. The second direction Dy is a direction parallel to the long side of the force sensor 1. In other words, the first direction Dx and the second direction Dy are orthogonal to each other. The direction orthogonal to the first direction Dx and the second direction Dy (normal direction of the input surface 1$a$) is referred to as a third direction Dz.

The second sensor 102 is a force sensor 20. The force sensor 20 is a device that detects force (load) input to a comprehensive detection region 5. The comprehensive detection region 5 overlaps at least two or more individual detection regions 4 when viewed from the force direction A1. Therefore, the force sensor 20 is a device that detects the whole load input across two or more individual detection regions 4. The comprehensive detection region 5 according to the present embodiment corresponds to the detection region 2. In other words, the entire detection region 2 overlaps the comprehensive detection region 5 when viewed from the force direction A1. The following describes the force sensor 1 in greater detail.

Figure 2:
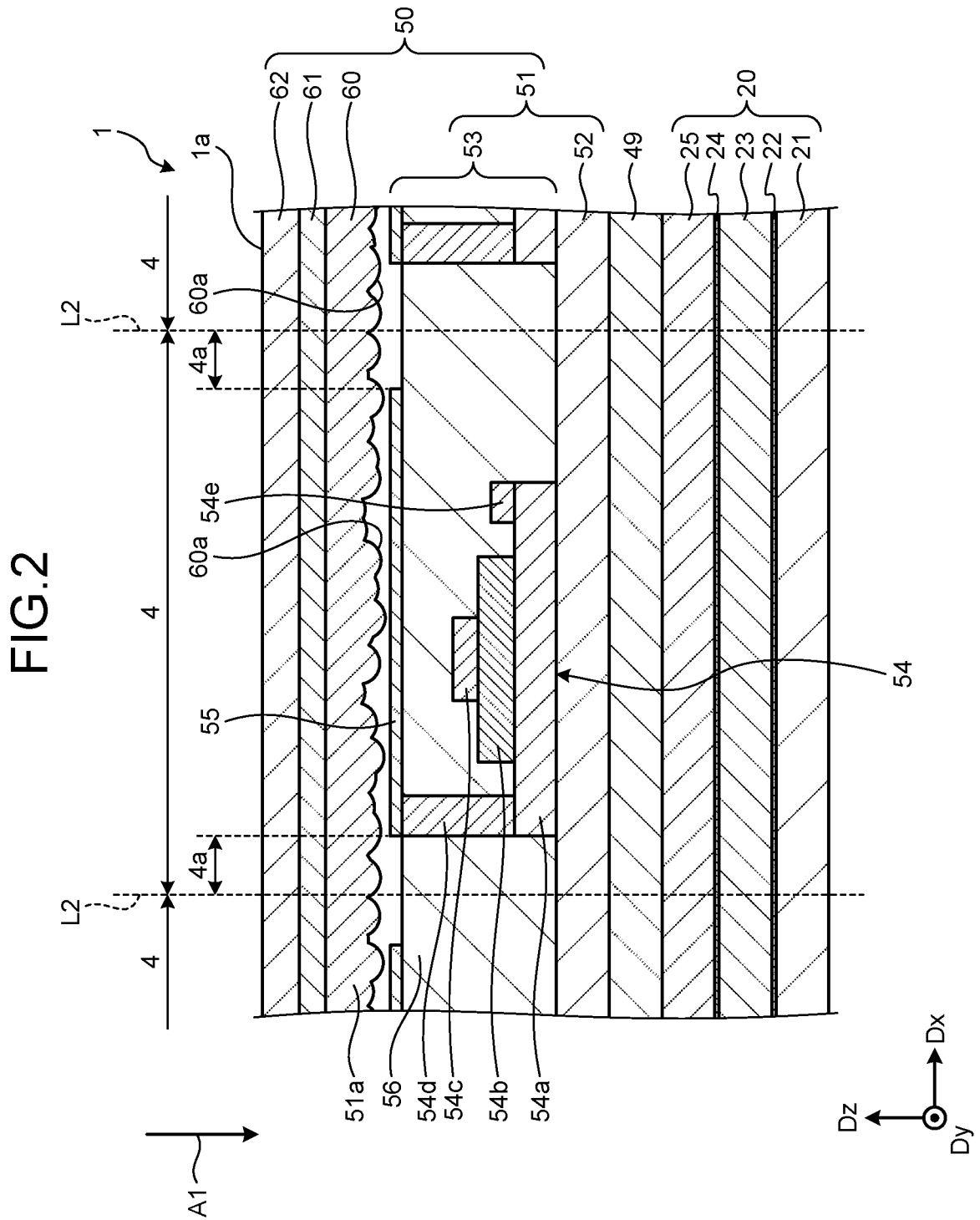
FIG. 2 is a sectional view of the force sensor according to the first embodiment.

FIG. 2 is a sectional view of the force sensor according to the first embodiment. As illustrated in FIG. 2, the force sensor 1 includes the force distribution sensor 50, an adhesive layer 49, and the force sensor 20 stacked in order from the force direction A1. In the following description, the force direction A1 may be referred to as the lower side, and the direction opposite to the force direction A1 may be referred to as the upper side.

The force distribution sensor 50 includes a first substrate 52, an array layer 53, a first sensor layer 60, a first counter electrode 61, and a first protective layer 62 disposed in order from the lower side. The first substrate 52 and the array layer 53 are integrated to constitute an array substrate 51.

The first substrate 52 and the first protective layer 62 are insulating and flexible substrates. The first substrate 52 and the first protective layer 62 are resin substrates or resin films, for example. The upper surface of the first protective layer 62 serves as the input surface 1$a$.

The array layer 53 includes a plurality of drive transistors 54 and various components for driving each drive transistor 54. As illustrated in FIG. 1, the various components are a coupler 7, a gate line drive circuit 8, a signal line selection circuit 9, gate lines 11 (refer to FIG. 3), and signal lines 12 (refer to FIG. 3).

The coupler 7, the gate line drive circuit 8, and the signal line selection circuit 9 are disposed in the peripheral region 3 in the array layer 53. The coupler 7 couples the force sensor 1 to a drive integrated circuit (IC) disposed outside the force sensor 1. The drive IC may be mounted as a chip on film (COF) on a flexible printed circuit board or a rigid circuit board coupled to the coupler 7. Alternatively, the drive IC may be mounted as a chip on glass (COG) in the peripheral region 3 of the first substrate 52.

The gate line drive circuit 8 is a circuit that drives the gate lines 11 (refer to FIG. 3) based on various control signals from the drive IC. The gate line drive circuit 8 sequentially or simultaneously selects the gate lines 11 and supplies gate drive signals to the selected gate lines 11. The signal line selection circuit 9 is a switch circuit that sequentially or simultaneously selects the signal lines 12 (refer to FIG. 3). The signal line selection circuit 9 is a multiplexer, for example. The signal line selection circuit 9 couples the selected signal lines 12 to the drive IC based on selection signal supplied from the drive IC.

Figure 3:
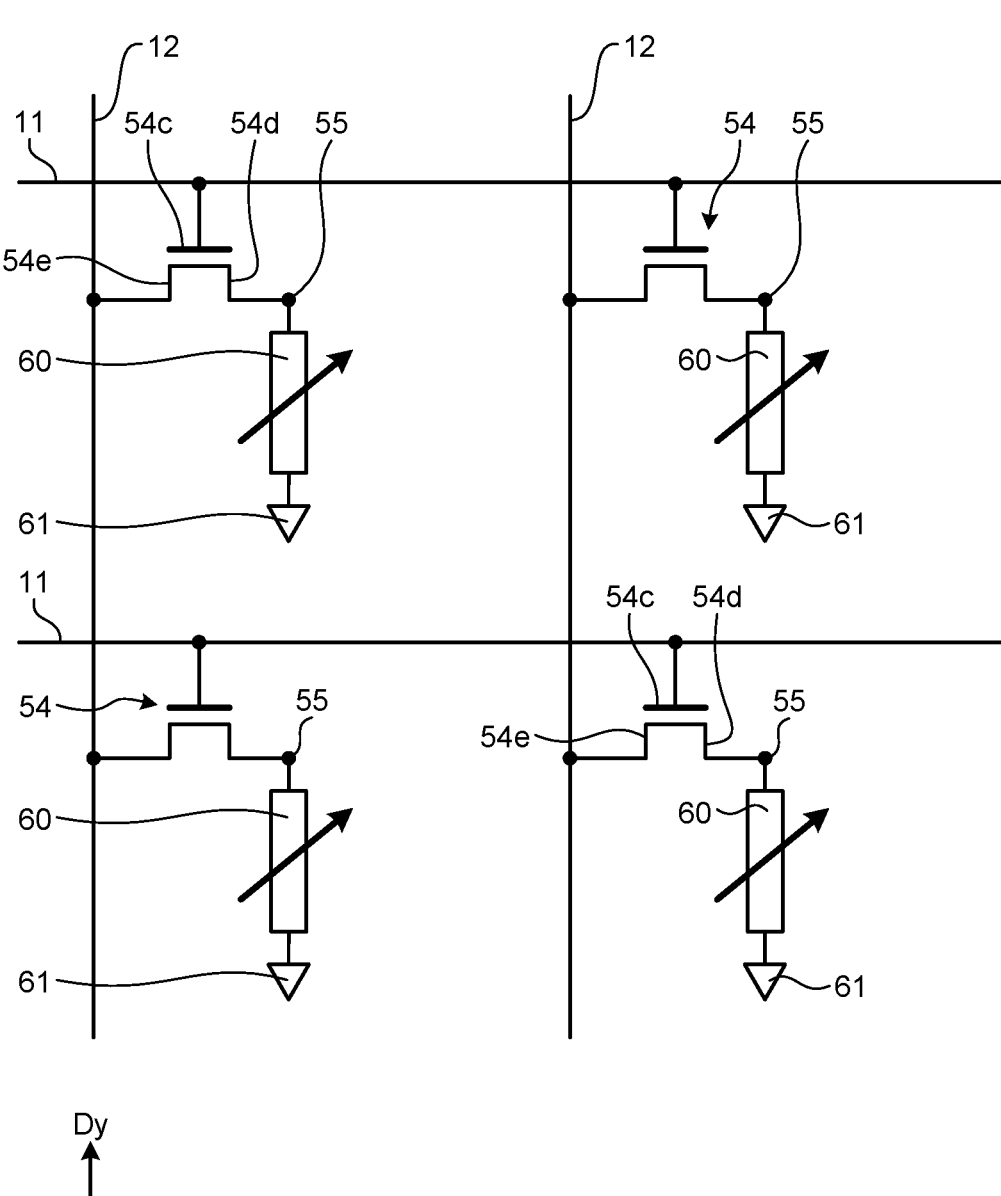
FIG. 3 is a circuit diagram of a circuit configuration of a force distribution sensor according to the first embodiment.

FIG. 3 is a circuit diagram of a circuit configuration of the force distribution sensor according to the first embodiment. As illustrated in FIG. 3, each gate line 11 extends in the first direction Dx. The gate lines 11 are arrayed in the second direction Dy. Each signal line 12 extends in the second direction Dy. The signal lines 12 are arrayed in the first direction Dx. The array layer 53 also includes common wiring, which is not specifically illustrated, extending along the peripheral region 3. The common wiring is coupled to the drive IC via the coupler 7 and is supplied with a certain amount of electric current from the drive IC.

The drive transistors 54 are provided to the respective individual detection regions 4. As illustrated in FIG. 2, the drive transistor 54 includes a semiconductor layer 54a, a gate insulating film 54b, a gate electrode 54c, a source electrode 54d, and a drain electrode 54e. The source electrode 54d is electrically coupled to an array electrode 55. The gate electrode 54c is coupled to the gate line 11. The drain electrode 54e is coupled to the signal line 12. With this configuration, when the gate line 11 is scanned, the electrical state of the array electrode 55, that is, the electrical signal (current value) input to the array electrode 55 is obtained via the signal line 12. The force value acting on the individual detection region 4 is determined based on the magnitude of the current value obtained via the signal line 12.

A first surface 51a of the array substrate 51 facing the first sensor layer 60 is planarized by an insulating layer 56 covering the drive transistors 54 and other components.

The array electrode 55 is provided on the first surface 51a of the array substrate 51. The array electrode 55 is made of metal material, such as indium tin oxide (ITO). The array electrode 55 has a rectangular shape when viewed from the force direction A1 (refer to FIG. 1). The size of the array electrode 55 is smaller than that of the individual detection region 4 (refer to FIG. 1). In other words, part of the outer periphery of the individual detection region 4 serves as an insensitive region 4a not overlapping the array electrode 55. The insensitive region 4a has a frame shape when viewed from the force direction A1.

The first counter electrode 61 is a solid film formed on the lower surface of the first protective layer 62. In other words, the first counter electrode 61 is a common electrode overlapping the entire detection region 2 when viewed from the force direction A1. The first counter electrode 61 is coupled to the common wiring (not illustrated) by wiring, which is not illustrated. Therefore, the first counter electrode 61 is supplied with a certain amount of electric current from the drive IC.

The first sensor layer 60 is provided on the lower surface of the first counter electrode 61. The first sensor layer 60 overlaps the entire detection region 2 when viewed from the force direction A1. The first sensor layer 60 is made of conductive resin. The first sensor layer 60 has a plurality of protrusions 60a on the lower surface. Each protrusion 60a is separated from the array electrode 55 and the first surface 51a of the array substrate 51. Therefore, a space is formed between the first sensor layer 60, and the array electrode 55 and the first surface 51a.

When the input surface 1a is pressed in the force distribution sensor 50, the first sensor layer 60 moves in the force direction A1, and the protrusions 60a of the first sensor layer 60 come into contact with the array electrode 55. As a result, the array electrode 55 is electrically coupled to the first counter electrode 61, and an electric current flows to the array electrode 55.

As the force acting on the first sensor layer 60 increases, the number of protrusions 60a in contact with the array electrode 55 increases, and the contact area with the array electrode 55 increases. In addition, the protrusions 60a are pressed against and planarized on the array electrode 55, thereby increasing the contact area with the array electrode 55. For this reason, the amount of electric current input to the array electrode 55 from the first sensor layer 60 increases in proportion to an increase in force (increase in contact area). Therefore, the force value can be detected based on the magnitude of the current value.

The force sensor 20 includes a second substrate 21, a detection electrode 22, a second sensor layer 23, a second counter electrode 24, and a second protective layer 25 disposed in order from the lower side. The second substrate 21 is an insulating substrate. Examples of the second substrate 21 include, but are not limited to, a glass substrate, a resin substrate, a resin film, etc. The second protective layer 25 is an insulating and flexible layer. The second protective layer 25 is made of a resin substrate or a resin film, for example.

The detection electrode 22 and the second counter electrode 24 are layers made of metal material. The detection electrode 22 is a solid film formed on the upper surface of the second substrate 21. The second counter electrode 24 is a solid film formed on the upper surface of the second sensor layer 23. The second counter electrode 24 is supplied with a certain amount of electric current from the drive IC disposed outside the force sensor 1 by wiring, which is not illustrated.

The second sensor layer 23 is a force-sensitive layer disposed between the detection electrode 22 and the second counter electrode 24. The second sensor layer 23 is made of a highly insulating resin layer containing conductive fine particles. The fine particles are dispersed and separated from each other in the resin layer. Therefore, when the resin layer is not deformed, the resistance of the second sensor layer 23 is high, and the detection electrode 22 is not electrically coupled to the second counter electrode 24.

By contrast, when the resin layer is deformed, the fine particles come into contact with or in proximity to each other, and the resistance of the second sensor layer 23 decreases. As a result, an electric current flows to the detection electrode 22. As the amount of deformation of the resin layer increases, the number of fine particles in contact with each other increases, and the resistance of the second sensor layer 23 is significantly reduced. Therefore, the amount of electric current flowing to the detection electrode 22 increases. Thus, the current value input to the detection electrode 22 increases in proportion to the input force. The electrical signal (current value) input to the detection electrode 22 is output by a signal line, which is not illustrated. Based on the magnitude of the current value, the whole load input to the comprehensive detection region 5 is derived. While the force sensor 20 according to the present embodiment is a resistive force sensor, the present disclosure is not limited to a resistive force sensor and may be a capacitive or piezoelectric force sensor, for example.

The detection electrode 22, the second sensor layer 23, and the second counter electrode 24 overlap the entire detection region 2 when viewed from the force direction A1. Therefore, the comprehensive detection region 5 corresponds to the detection region 2, and the force sensor 20 detects the weight (whole load) input to the detection region 2.

The adhesive layer 49 is a layer that bonds the first sensor 101 and the second sensor 102. The adhesive layer 49 according to the present embodiment adheres to the second protective layer 25 of the force sensor 20 and the first substrate 52 of the force distribution sensor 50. The adhesive layer 49 is thermosetting resin or a double-sided tape, for example.

Figure 4:
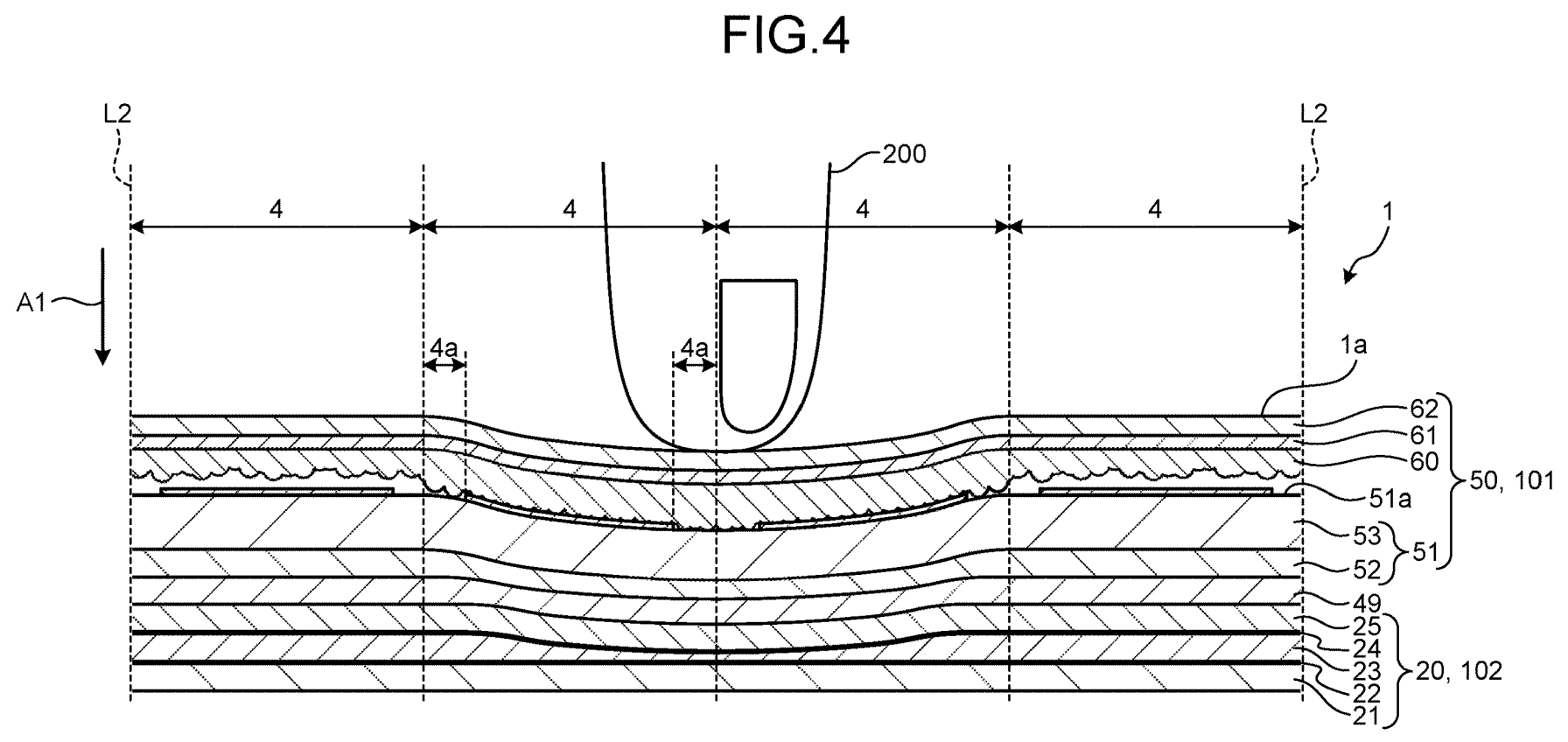

FIG. 4 is a sectional view of a state where force is input to the force sensor according to the first embodiment. The following describes an example of operation performed by the force sensor 1 according to the first embodiment. FIG. 4 does not illustrate the drive transistors 54. As illustrated in FIG. 4, when the input surface 1*a* is pressed by a finger 200, a load in the force direction A1 acts on the input surface 1*a*. The finger 200 is pressing the boundary (boundary line L2) between two adjacent individual detection regions 4. In other words, the load in the force direction A1 acts across the two individual detection regions 4.

The first sensor layer 60 of the force distribution sensor 50 moves in the force direction A1. The first sensor layer 60 comes into contact with the array electrode 55, and an electric current flows to the array electrode 55. In the present embodiment, the electric current flows to each of the two adjacent array electrodes 55. As a result, the force values are detected in the two individual detection regions 4.

The array electrodes 55 receive the load in the force direction A1 from the first sensor layer 60 and are deformed to sink downward. In other words, part of the array substrate 51 is deformed to sink downward, and the load in the force direction A1 is transmitted to the force sensor 20. Thus, the adhesive layer 49, the second protective layer 25, and the second counter electrode 24 are also deformed to sink downward. As a result, the thickness of the second sensor layer 23 decreases, and an electric current flows to the detection electrode 22.

As illustrated in FIG. 4, the insensitive region 4*a* of the individual detection region 4 is provided with the first sensor layer 60 on the lower side but is not provided with the array electrode 55. If the force is input to the insensitive region 4*a*, the first sensor layer 60 only comes into contact with the first surface 51*a* of the array substrate 51. Therefore, the force input to the insensitive region 4*a* is not detected by the force distribution sensor 50.

By contrast, the force load by which the first sensor layer 60 presses the first surface 51*a* is transmitted to the force sensor 20. As a result, the thickness of the part of the second sensor layer 23 overlapping the insensitive region 4*a* decreases, and an electric current flows to the detection electrode 22. Therefore, the whole load including the load input to the insensitive region 4*a* is detected as the force value detected by the force sensor 20.

As described above, the force sensor 1 according to the first embodiment can detect the force distribution and accurately detect the whole load value.

Second Embodiment

Figure 5:
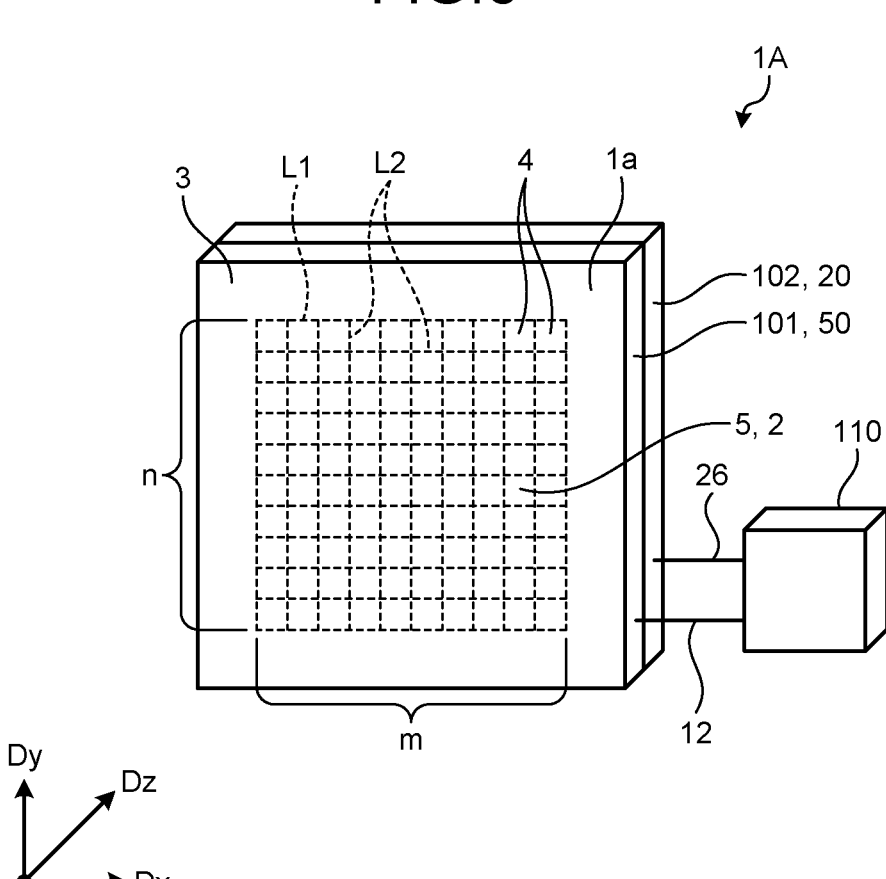
FIG. 5 is a view schematically illustrating the configuration of the force sensor according to a second embodiment.

FIG. 5 is a view schematically illustrating the configuration of the force sensor according to a second embodiment. As illustrated in FIG. 5, a force sensor 1A according to the second embodiment is different from the force sensor 1 according to the first embodiment in that it further includes an information processor 110. The following mainly describes the differences.

The information processor 110 is a device that corrects the force value of each of the individual detection regions 4 obtained by the force distribution sensor 50. The information processor 110 is coupled to the signal lines 12 of the force distribution sensor 50 and signal lines 26 of the force sensor 20 to obtain the results (electrical signals) of the force distribution sensor 50 and the force sensor 20.

The information processor 110 derives a force value pi acting on each of the individual detection regions 4 and a force value W acting on the comprehensive detection region 5 from the results (electrical signals) of the force distribution sensor 50 and the force sensor 20. The information processor 110 calculates a correction coefficient A by the following Expression 1.

$$A \times \int_1^m \int_1^n p_i s_i = W \qquad (1)$$

pi in Expression 1 is the force value of each of the individual detection regions 4 obtained by the force distribution sensor 50. si in Expression 1 is the area of each of the individual detection regions 4. W in Expression 1 is the whole load obtained by the force sensor 20. m in Expression 1 is the number of individual detection regions 4 arrayed in the first direction Dx intersecting the force direction A1. n in Expression 1 is the number of individual detection regions 4 arrayed in the second direction Dy intersecting both the force direction A1 and the first direction Dx. The area si of each of the individual detection regions 4 is measured in advance and stored in the information processor 110.

Now, Expression 1 is explained. In the left side of Expression 1 excluding the correction coefficient A, the total force value is calculated by adding up the force values of m×n individual detection regions 4, and the total load is calculated by multiplying the total force value by the area si of each of the individual detection regions 4. The total load is originally equal to the whole load value (right side of Expression 1) acting on the entire detection region 2. The force distribution sensor 50, however, does not detect the force (load) input to the insensitive region 4*a*. In addition, it is necessary to consider the hysteresis characteristics of the first sensor layer 60. Therefore, if the total load is calculated by adding up the force values of the m×n individual detection regions 4 and multiplying the obtained total force value by the area si of each of the individual detection regions 4, the total load value is not equal to the whole load value.

For this reason, the information processor 110 calculates the correction coefficient A by dividing the whole load value W derived from the results of the force sensor 20 by the total force value. After the correction coefficient A is derived, the information processor 110 calculates and outputs a corrected force value pi* of the individual detection region 4 by the following Expression 2.

$$p_i^* = A \times p_i \qquad (2)$$

The pi* in Expression 2 is the corrected force value in the individual detection region 4. The force value in the individual detection region 4 according to the second embodiment takes into account the force input to the insensitive region 4*a* and the hysteresis characteristics of the first sensor layer 60, thereby improving accuracy and reliability.

The following describes a third embodiment and first to third modifications in which the adhesion and/or positional relation between the force distribution sensor 50 and the force sensor 20 is changed.

Third Embodiment

Figure 6:
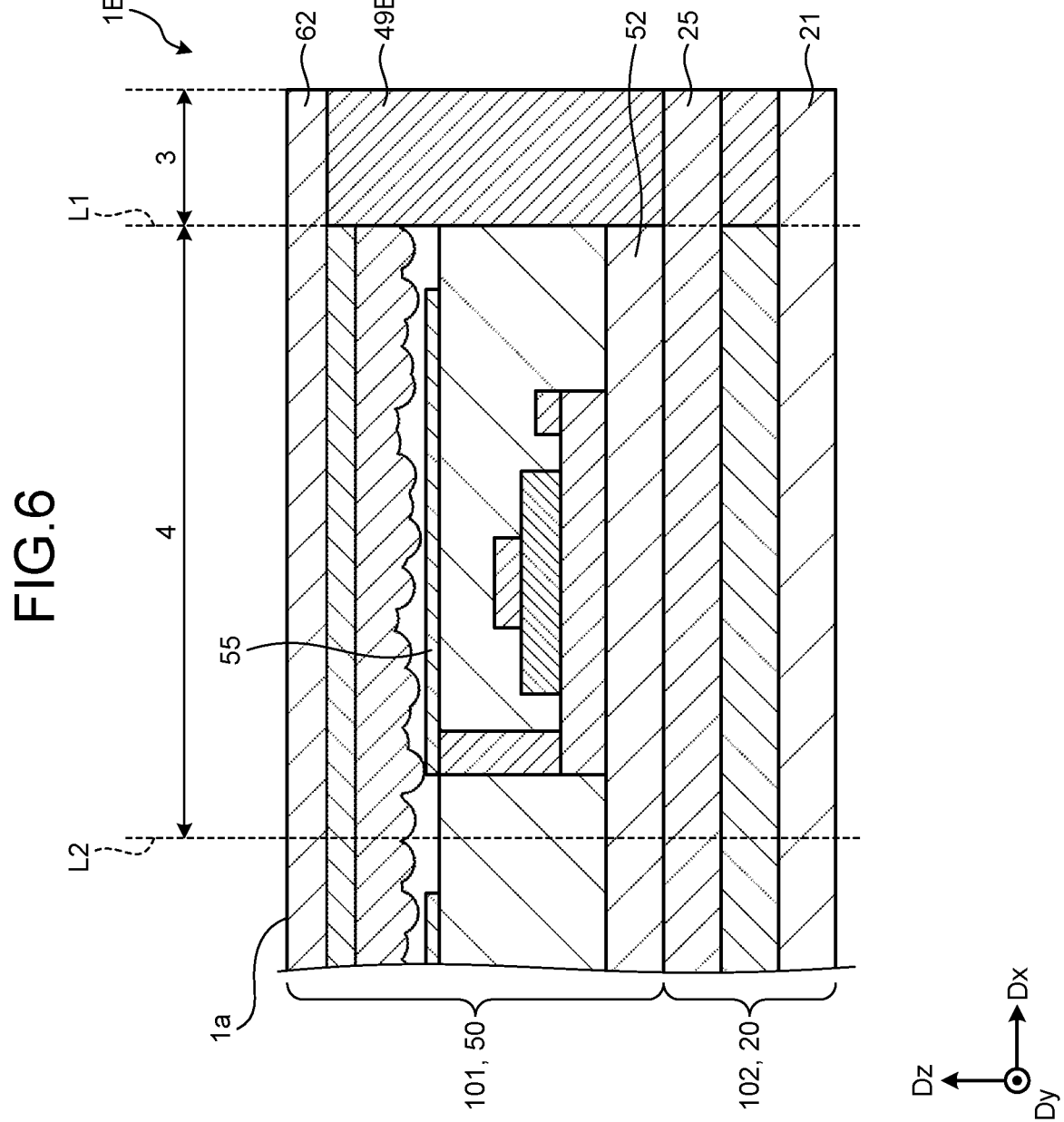
FIG. 6 is a sectional view of the force sensor according to a third embodiment.

FIG. 6 is a sectional view of the force sensor according to the third embodiment. As illustrated in FIG. 6, a force sensor 1B according to the third embodiment is different from the first embodiment in that it does not include the adhesive layer 49 disposed between the force distribution sensor 50 and the force sensor 20.

The force sensor 1B according to the third embodiment is different from the first embodiment in that a frame-like adhesive layer 49B is provided in the peripheral region of the force distribution sensor 50. The upper end of the adhesive layer 49B adheres to the lower surface of the first protective layer 62. The lower end of the adhesive layer 49B adheres to the upper surface of the second protective layer 25 of the force sensor 20. As a result, the force distribution sensor 50 is integrated with the force sensor 20.

As described above, the force distribution sensor 50 and the force sensor 20 according to the third embodiment are stacked in contact with each other in the third direction Dz. Therefore, the thickness in the third direction Dz is smaller than that according to the first embodiment. In addition, the force is effectively input to the force sensor 20 because the adhesive layer 49 is not interposed between the force distribution sensor 50 and the force sensor 20.

First Modification

Figure 7:
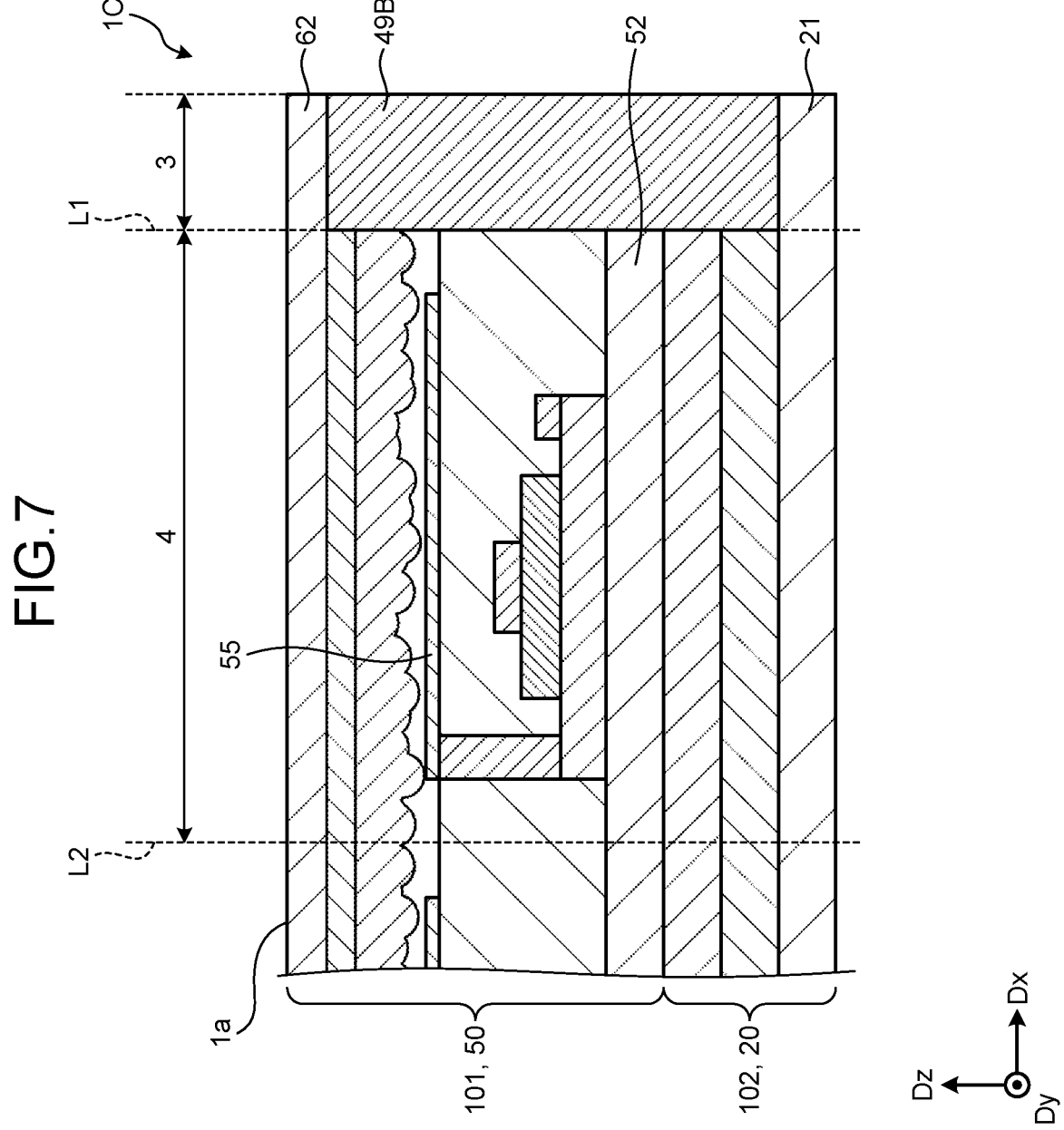
FIG. 7 is a sectional view of the force sensor according to a first modification.

FIG. 7 is a sectional view of the force sensor according to the first modification. As illustrated in FIG. 7, a force sensor 1C according to the first modification is different from the third embodiment in that the lower end of the frame-like adhesive layer 49B is coupled to the second substrate 21 of the force sensor 20. The force sensor 1C according to the first modification can also have advantageous effects equivalent to those of the third embodiment.

Second Modification

Figure 8:
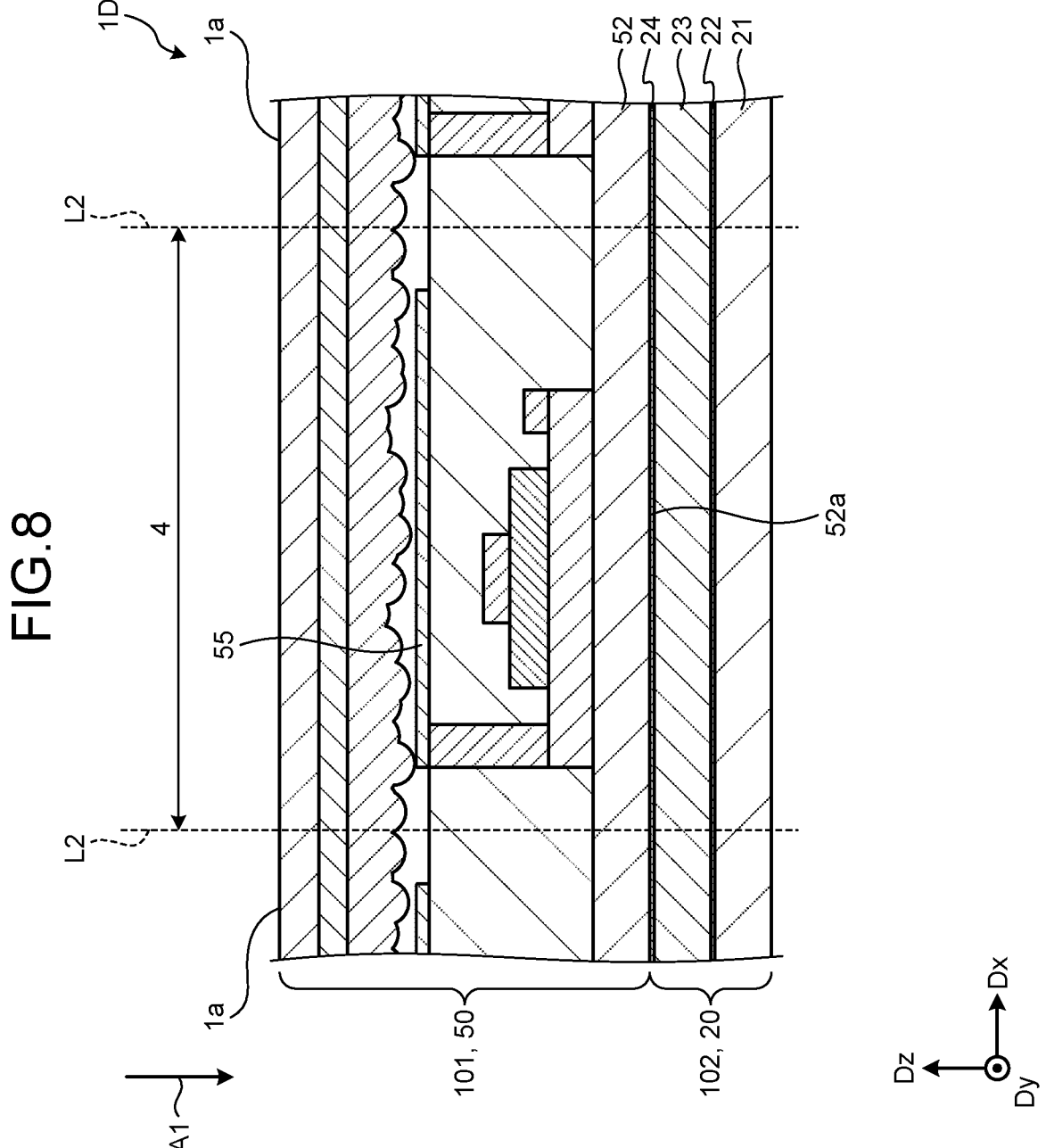
FIG. 8 is a sectional view of the force sensor according to a second modification.

FIG. 8 is a sectional view of the force sensor according to the second modification. As illustrated in FIG. 8, a force sensor 1D according to the second modification is different from the first embodiment in that it does not include the adhesive layer 49 or the second protective layer 25. In other words, the second counter electrode 24 of the force sensor 20 is formed on a bottom surface 52a of the first substrate 52 in the force sensor 1D according to the second modification. The bottom surface 52a is the surface of the first sensor 101 facing the force direction A1.

As described above, the second sensor 102 according to the second modification includes a first electrode (second counter electrode 24) and a second electrode (detection electrode 22) disposed in the force direction A1 with respect to the first electrode and opposing the first electrode. The first electrode (second counter electrode 24) is provided on the bottom surface 52a of the first sensor 101. Therefore, the thickness in the third direction Dz is smaller than that according to the first embodiment and the first modification. In addition, the force is effectively input to the force sensor 20 because neither the adhesive layer 49 nor the second protective layer is interposed between the force distribution sensor 50 and the force sensor 20.

Third Modification

Figure 9:
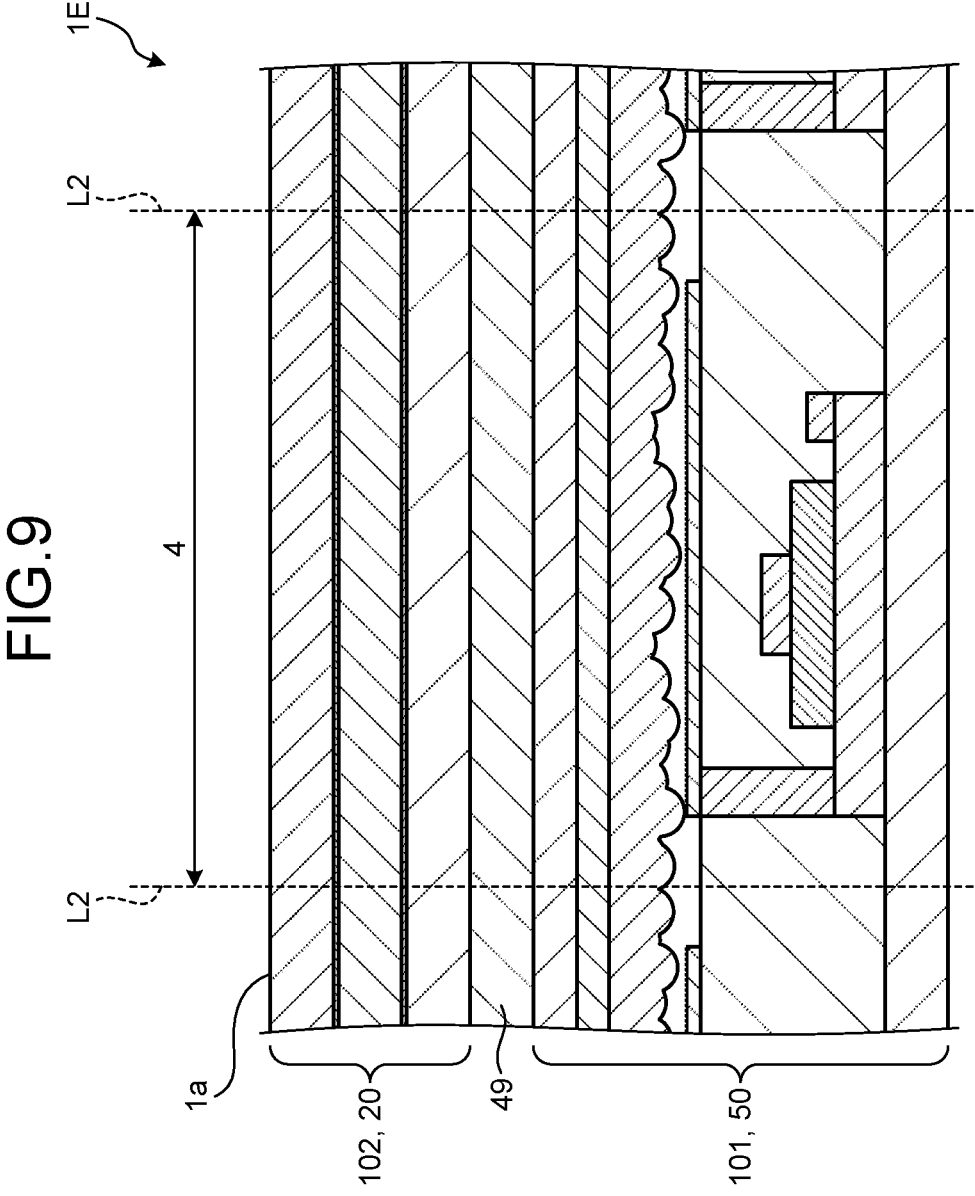
FIG. 9 is a sectional view of the force sensor according to a third modification.

FIG. 9 is a sectional view of the force sensor according to the third modification. As illustrated in FIG. 9, a force sensor 1E according to the third modification includes the first sensor 101 and the second sensor 102 stacked in order in the force direction A1 similarly to the first embodiment. The third modification is different from the first embodiment in that the first sensor 101 is the force sensor 20 and that the second sensor 102 is the force distribution sensor 50. The third modification also has advantageous effects equivalent to those of the first embodiment. In the present modification, the upper surface of the second protective layer 25 of the force sensor 20 serves as the input surface 1a.

While both the detection electrode 22 and the second counter electrode 24 of the force sensor 20 according to the first embodiment have the same size as that of the detection region 2, the present disclosure is not limited thereto. In other words, the comprehensive detection region 5 simply needs to include at least two or more individual detection regions 4. The following describes modifications in which the detection electrode 22 and the second counter electrode 24 in the force sensor 20 are modified. In the following description, only the detection electrode 22 and the second counter electrode 24 are extracted and explained.

Fourth Embodiment

Figure 10:
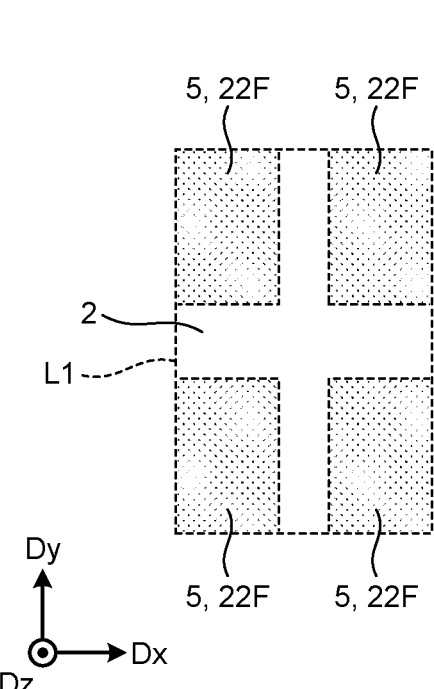
FIG. 10 is a plan view of a detection electrode and a counter electrode according to a fourth embodiment.
Figure 10:
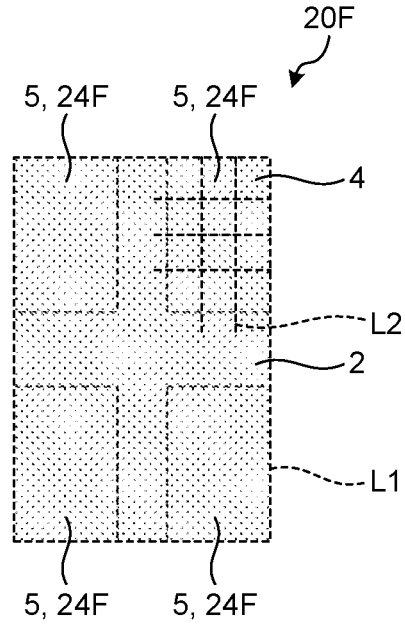

FIG. 10 is a plan view of the detection electrode and the counter electrode according to a fourth embodiment. In a force sensor 20F according to the fourth embodiment, a detection electrode 22F is divided into four parts. More specifically, the detection electrode 22F is divided into two rows in the first direction Dx and two rows in the second direction Dy. By contrast, a second counter electrode 24F is formed over the entire detection region 2 similarly to the first embodiment.

In the configuration according to the fourth embodiment, the region overlapping the detection electrode 22F when viewed from the force direction A1 serves as the comprehensive detection region 5. In other words, the comprehensive detection region 5 is divided into four parts. The comprehensive detection region 5 includes two or more individual detection regions 4. As described above, the force sensor 20F according to the fourth embodiment detects the whole load in the region overlapping the comprehensive detection region 5.

Fourth Modification

Figure 11:
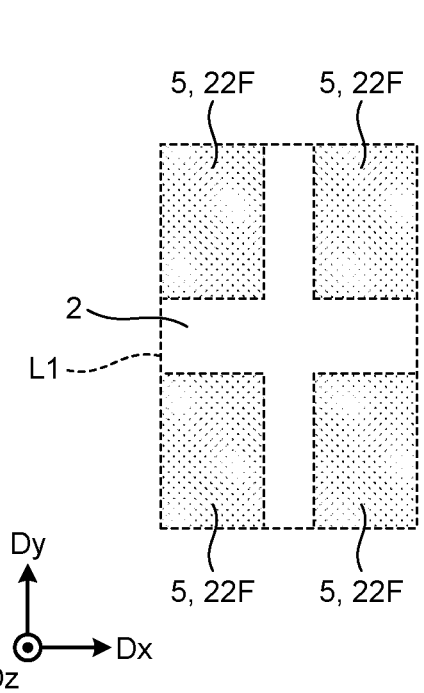
FIG. 11 is a plan view of the detection electrode and the counter electrode according to a fourth modification.
Figure 11:
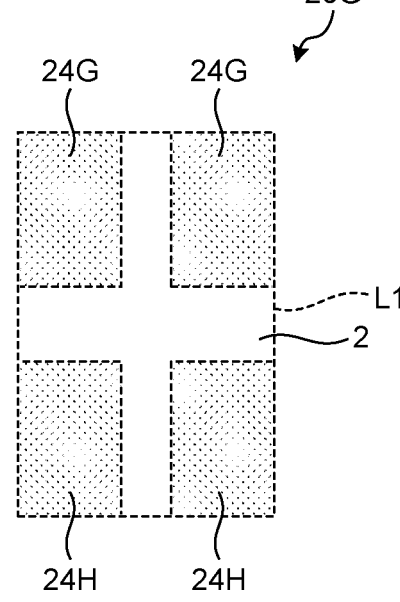

FIG. 11 is a plan view of the detection electrode and the counter electrode according to a fourth modification. A second counter electrode 24G of a force sensor 20G according to the fourth modification is divided into four parts corresponding to four detection electrodes 22F. The comprehensive detection region 5 according to the fourth modification is the region overlapping the detection electrode 22F, and the fourth modification has advantageous effects equivalent to those of the fourth embodiment.

Fifth Modification

Figure 12:
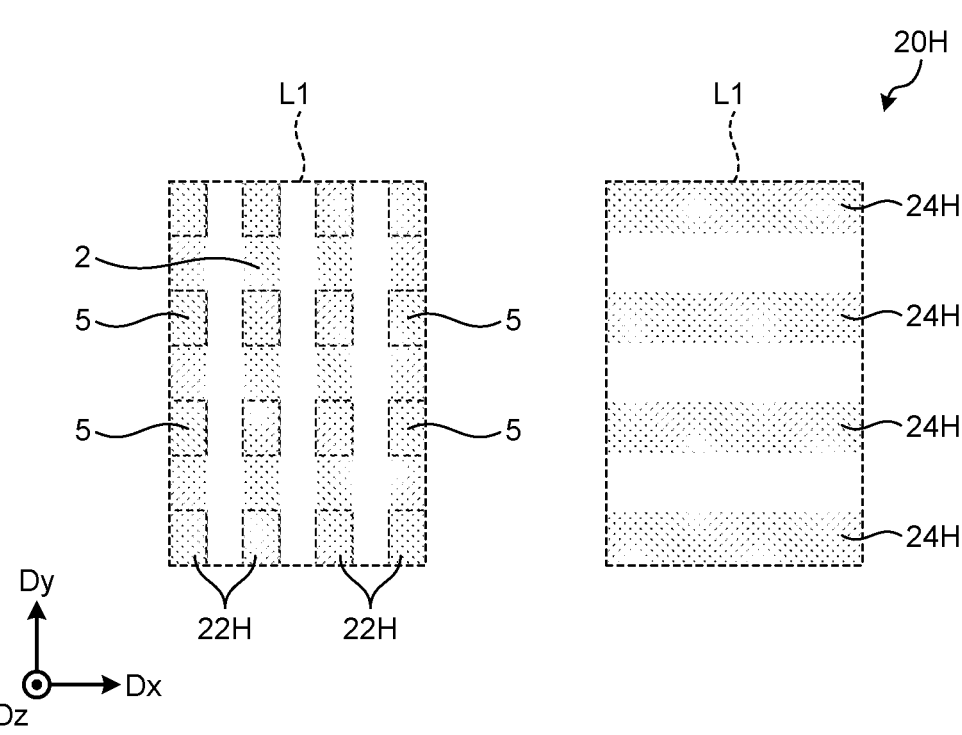
FIG. 12 is a plan view of the detection electrode and the counter electrode according to a fifth modification.

FIG. 12 is a plan view of the detection electrode and the counter electrode according to a fifth modification. A detection electrode 22H of a force sensor 20H according to the fifth modification is divided into a plurality of parts in the first direction Dx. A second counter electrode 24H is divided into a plurality of parts in the second direction Dy. Therefore, the detection electrodes 22H and the second counter electrodes 24H intersect each other, and the force sensor 20H is referred to as what is called a passive matrix sensor. In the configuration according to the fifth modification, the region where the detection electrode 22H and the second counter electrode 24H overlap serves as the comprehensive detection region 5. In other words, the comprehensive detection regions 5 are arrayed in a matrix (row-column configuration) in the first direction Dx and the second direction Dy. As described above, the force sensor 20H according to the fifth modification can also detect the whole load acting on the region overlapping the comprehensive detection region 5.

Figure 13:
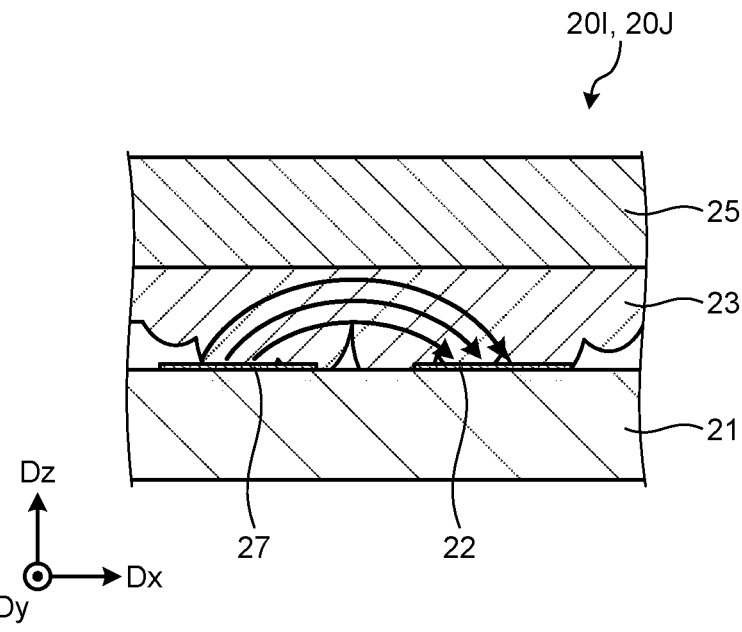
FIG. 13 is a sectional view of the force sensor (force sensor according to sixth and seventh modifications) including parallel electrodes.

FIG. 13 is a sectional view of the force sensor (force sensor according to sixth and seventh modifications) including parallel electrodes. While the above describes the modifications of the facing electrodes (the detection electrode 22 and the second counter electrode 24) disposed to oppose each other in the third direction Dz, the present disclosure is not limited to the facing electrodes. As illustrated in FIG. 13, the detection electrode 22 and a common electrode 27 according to the present disclosure may be parallel electrodes disposed in the planar direction (direction parallel to both the first direction Dx and the second direction Dy). With the parallel electrodes, an electric current flows in the planar direction in the second sensor layer 23 (refer to the arrows in FIG. 13). The following describes the parallel electrodes in greater detail.

Sixth Modification

Figure 14:
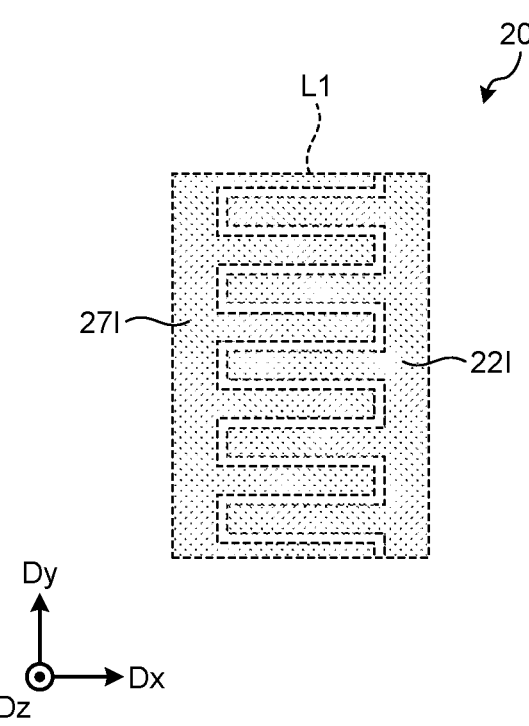
FIG. 14 is a plan view of the detection electrode and a common electrode according to the sixth modification.

FIG. 14 is a plan view of the detection electrode and the common electrode according to the sixth modification. A detection electrode 22I and a common electrode 27I of a force sensor 20I according to the sixth modification each include one electrode extending in the second direction Dy and a plurality of electrodes extending from the electrode in the first direction Dx and have what is called a comb shape. The electrodes extending in the first direction Dx of the detection electrode 22I and the common electrode 27I are alternately disposed in the second direction Dy.

Seventh Modification

Figure 15:
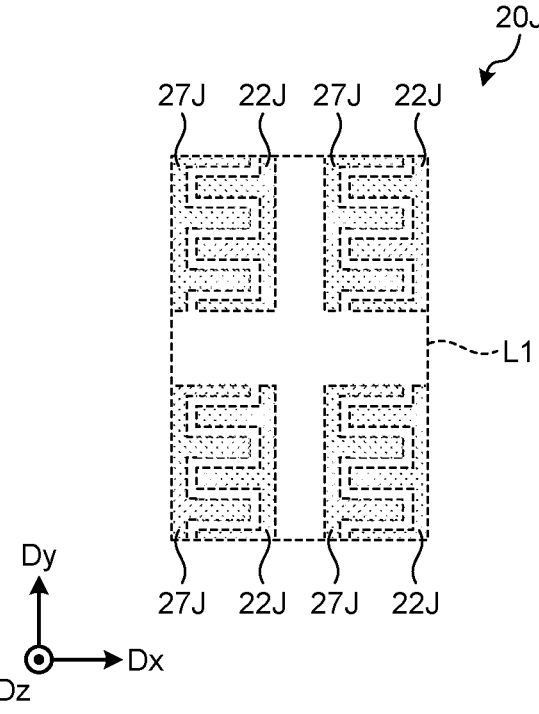
FIG. 15 is a plan view of the detection electrode and the common electrode according to the seventh modification.

FIG. 15 is a plan view of the detection electrode and the common electrode according to the seventh modification. A detection electrode 22J and a common electrode 27J of a force sensor 20J according to the seventh modification each have a comb shape similarly to the sixth modification. The detection electrode 22J and the common electrode 27J according to the seventh modification are each divided into four parts.

Figure 16:
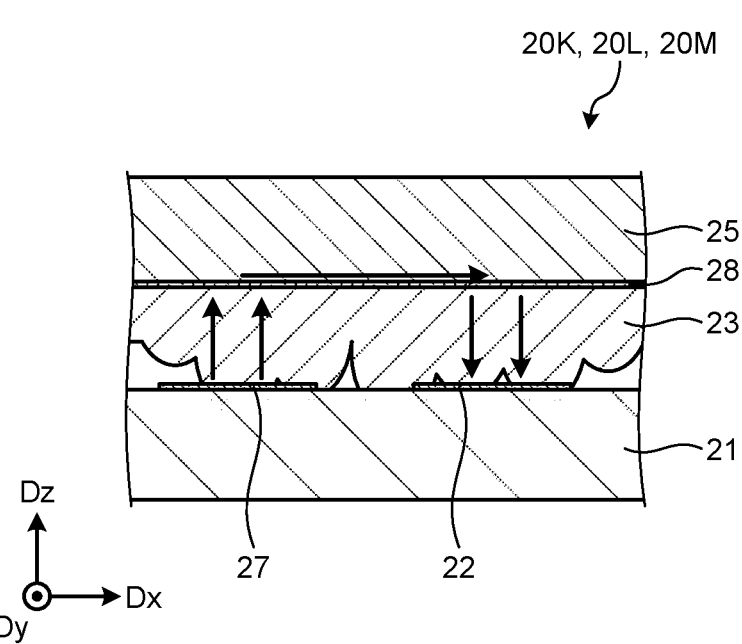
FIG. 16 is a sectional view of the force sensor (force sensor according to eighth to tenth modifications) including hybrid electrodes.

FIG. 16 is a sectional view of the force sensor (force sensor according to eighth to tenth modifications) including hybrid electrodes. The electrodes according to the present disclosure may be hybrid electrodes obtained by combining the facing electrodes and the parallel electrodes. In the hybrid electrodes, the detection electrode 22 and the common electrode 27 are disposed on the upper surface of the second substrate 21 as illustrated in FIG. 16. In addition, an intermediate electrode 28 is disposed on the lower surface of the second protective layer 25. The intermediate electrode 28 is opposed to the detection electrode 22 and the common electrode 27. When force is input to the force sensor including the hybrid electrodes, an electric current first flows from the common electrode 27 to the intermediate electrode 28. The electric current then flows in the planar direction along the intermediate electrode 28. Subsequently, the electric current flows to the detection electrode 22 via the second sensor layer 23. The following describes the hybrid electrodes in greater detail.

Eighth Modification

Figure 17:
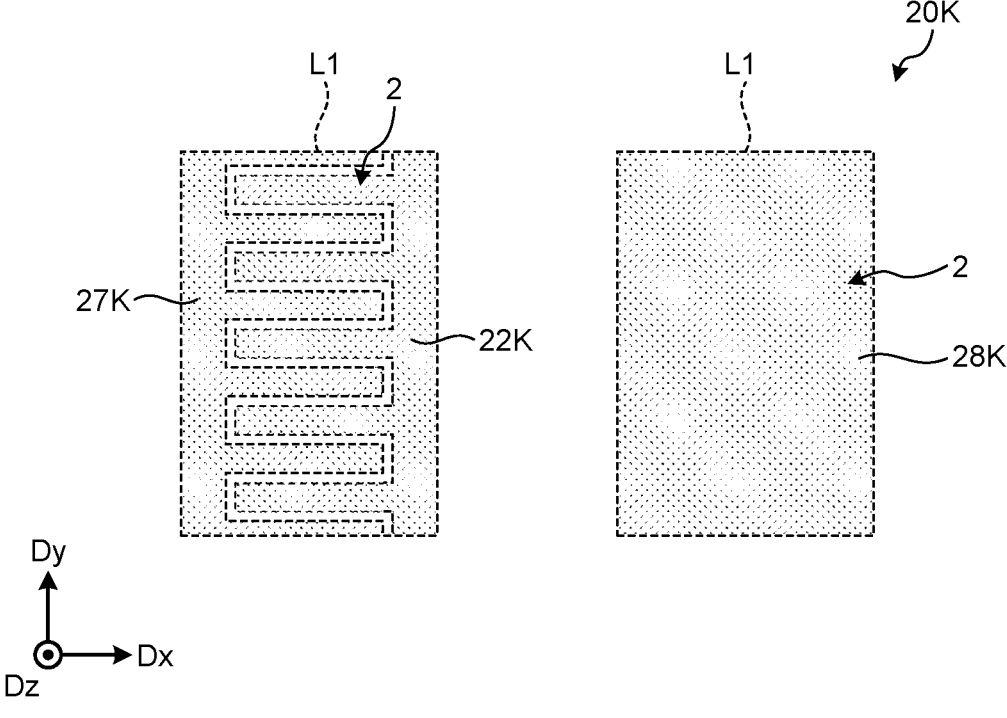
FIG. 17 is a plan view of the detection electrode, the common electrode, and an intermediate electrode according to the eighth modification.

FIG. 17 is a plan view of the detection electrode, the common electrode, and the intermediate electrode according to the eighth modification. A detection electrode 22K and a common electrode 27K of a force sensor 20K according to the eighth modification each have what is called a comb shape. Therefore, the detection electrode 22K and the common electrode 27K have the same shape as that of the detection electrode 22I and the common electrode 27I according to the sixth modification. An intermediate electrode 28K is a solid film extending over the entire detection region 2. Therefore, the intermediate electrode 28K has the same shape as that of the second counter electrode 24 according to the first embodiment. In the force sensor 20K according to the eighth modification, an electric current flows to the detection electrode 22K via the intermediate electrode 28K.

Ninth Modification

Figure 18:
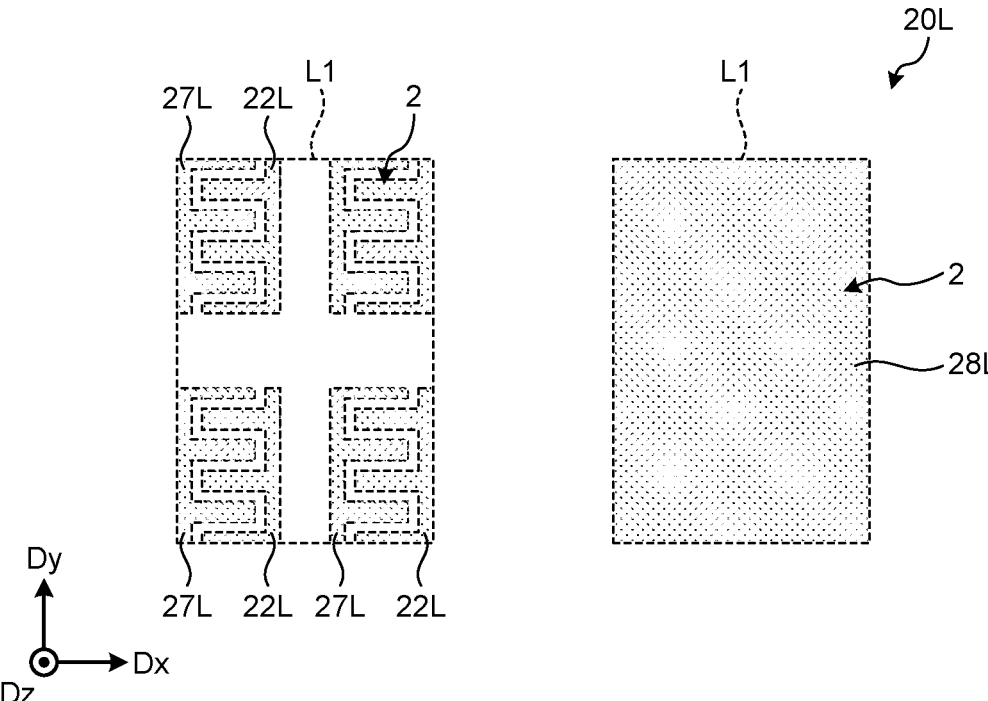
FIG. 18 is a plan view of the detection electrode, the common electrode, and the intermediate electrode according to the ninth modification.

FIG. 18 is a plan view of the detection electrode, the common electrode, and the intermediate electrode according to the ninth modification. A detection electrode 22L and a common electrode 27L of a force sensor 20L according to the ninth modification each have what is called a comb shape and are divided into four parts. Therefore, the detection electrode 22L and the common electrode 27L have the same shape as that of the detection electrode 22J and the common electrode 27J according to the seventh modification. An intermediate electrode 28L is a solid film extending over the entire detection region 2 and has the same shape as that of the second counter electrode 24 according to the first embodiment.

Tenth Modification

Figure 19:
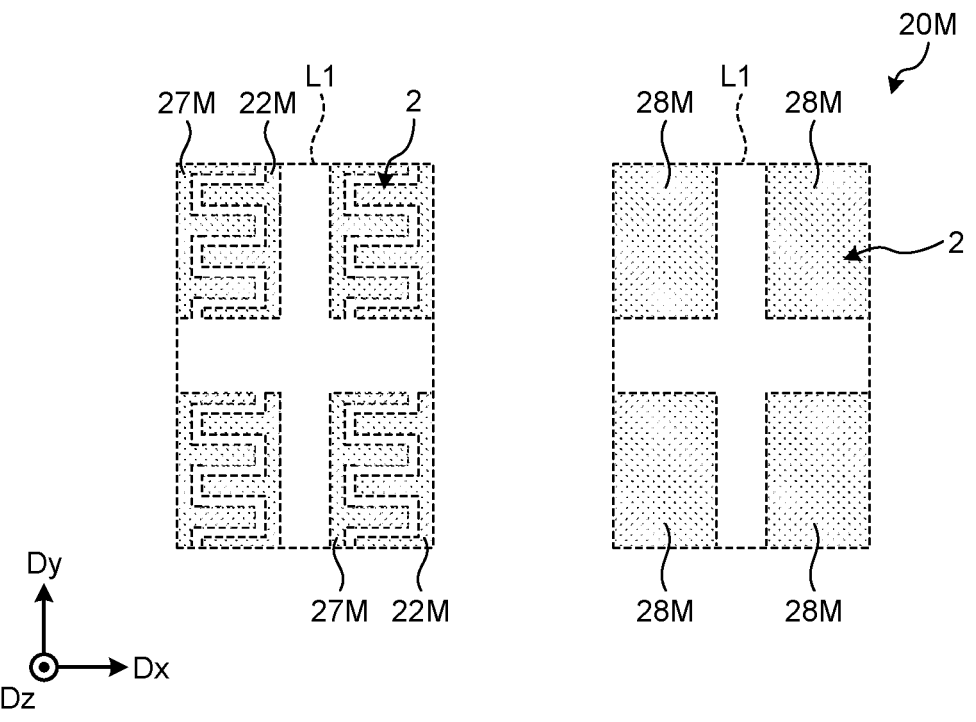
FIG. 19 is a plan view of the detection electrode, the common electrode, and the intermediate electrode according to the tenth modification.

FIG. 19 is a plan view of the detection electrode, the common electrode, and the intermediate electrode according to the tenth modification. In a force sensor 20M according to the tenth modification, a detection electrode 22M and a common electrode 27M have the same shape as that of the detection electrode 22J and the common electrode 27J according to the seventh modification and are divided into four parts. An intermediate electrode 28M is a solid film divided into four parts. The four intermediate electrodes 28M each overlap the detection electrode 22M and the common electrode 27M when viewed from the third direction Dz.

The following describes the second sensor layer 23 of the force sensor 20. While the second sensor layer 23 according to the first embodiment is a resin layer containing conductive fine particles, the present disclosure is not limited thereto. The following describes an eleventh modification and a twelfth modification made of conductive resin.

Eleventh Modification

Figure 20:
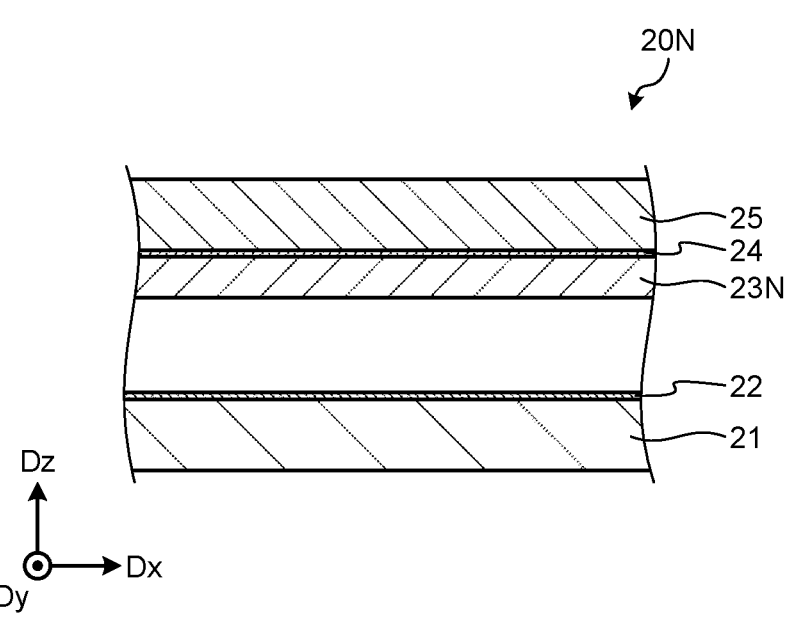
FIG. 20 is a sectional view of the force sensor according to an eleventh modification before force is input.
Figure 21:
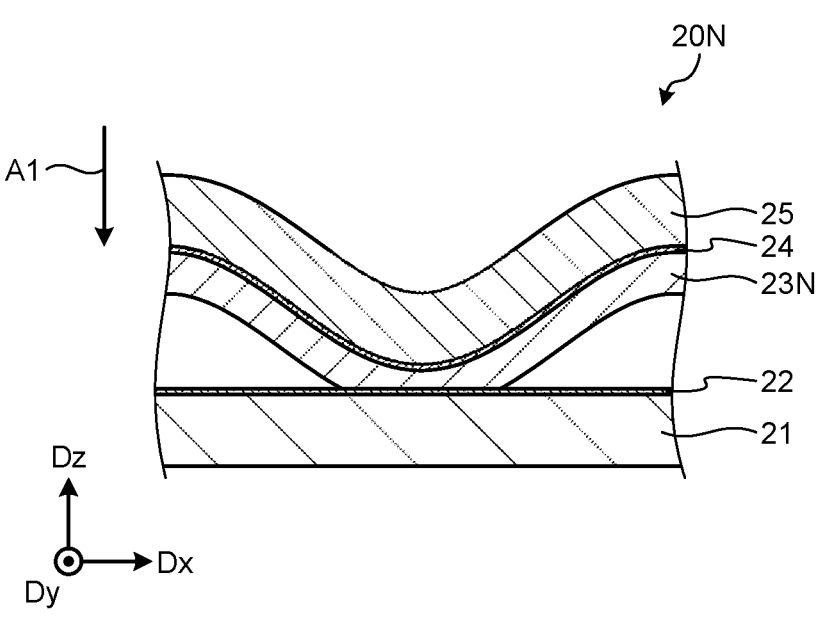
FIG. 21 is a sectional view of the force sensor according to the eleventh modification after force is input.

FIG. 20 is a sectional view of the force sensor according to the eleventh modification before force is input. FIG. 21 is a sectional view of the force sensor according to the eleventh modification after force is input. As illustrated in FIG. 20, a second sensor layer 23N of a force sensor 20N according to the eleventh modification is made of conductive resin. The second sensor layer 23N is not in contact with the detection electrode 22 before the force is input.

As illustrated in FIG. 21, when the force is input, the second sensor layer 23N is deformed to be recessed in the force direction A1 and comes into contact with the detection electrode 22. As a result, an electric current flows to the detection electrode 22. As the force increases, and the contact area between the second sensor layer 23N and the detection electrode 22 increases, the electric current flowing to the detection electrode 22 also increases.

Twelfth Modification

Figure 22:
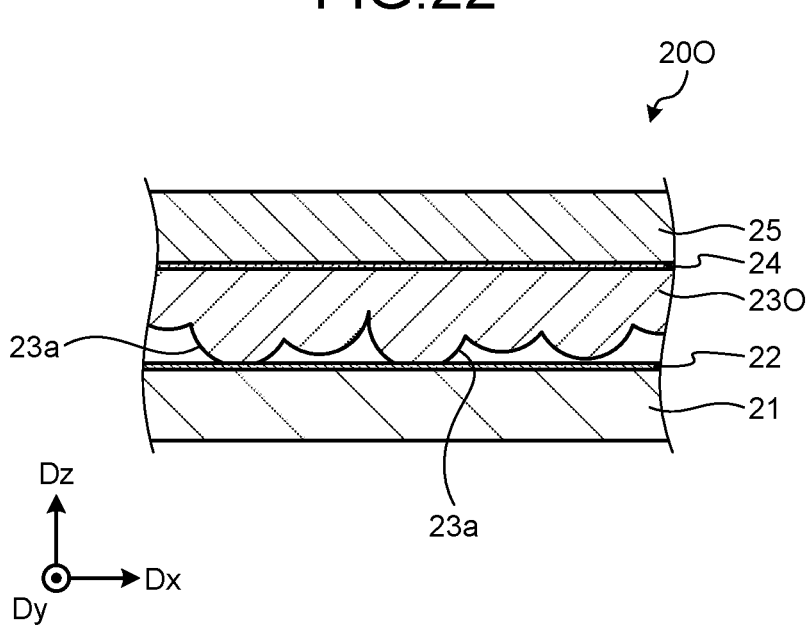
FIG. 22 is a sectional view of the force sensor according to a twelfth modification before force is input.
Figure 23:
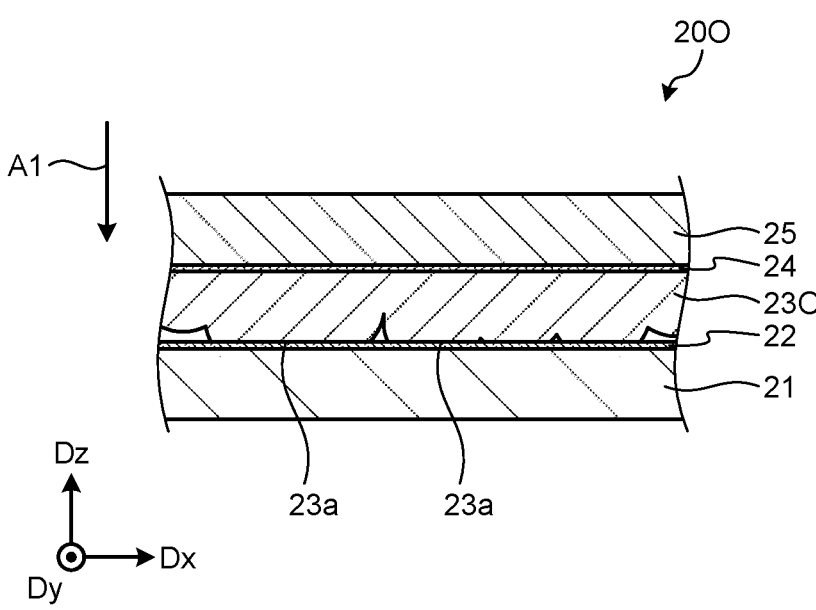
FIG. 23 is a sectional view of the force sensor according to the twelfth modification after force is input.

FIG. 22 is a sectional view of the force sensor according to the twelfth modification before force is input. FIG. 23 is a sectional view of the force sensor according to the twelfth modification after force is input. As illustrated in FIG. 22, a second sensor layer 23O of a force sensor 20O according to the twelfth modification is made of conductive resin. The second sensor layer 23O has a plurality of protrusions 23a protruding toward the detection electrode 22. In the second sensor layer 23O, some of the protrusions 23a are in contact with the detection electrode 22 before the force is input. The number of protrusions 23a in contact with the detection electrode 22 is small, and the second sensor layer 23O maintains the insulating state.

As illustrated in FIG. 23, when the force is input, the second sensor layer 23O is deformed to move in the force direction A1, thereby increasing the number of protrusions 23a in contact with the detection electrode 22. As a result, an electric current flows to the detection electrode 22 via the second sensor layer 23O. As the force further increases, the number of protrusions 23a in contact with the detection electrode 22 further increases. In addition, the protrusions 23a are pressed against and planarized on the array electrode 55, thereby increasing the contact area with the array electrode 55. As a result, the electric current flowing to the detection electrode 22 increases.

While the force sensor according to the embodiments and the modifications described above include the sensor layer (force-sensitive layer), the present disclosure is not limited thereto. The following describes thirteenth to fifteenth modifications not including the sensor layer.

Thirteenth Modification

Figure 24:
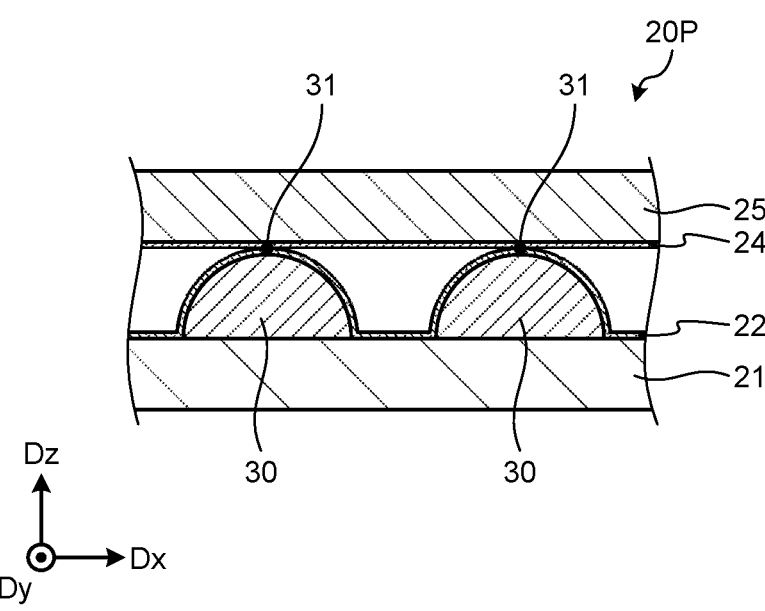
FIG. 24 is a sectional view of the force sensor according to a thirteenth modification before force is input.
Figure 25:
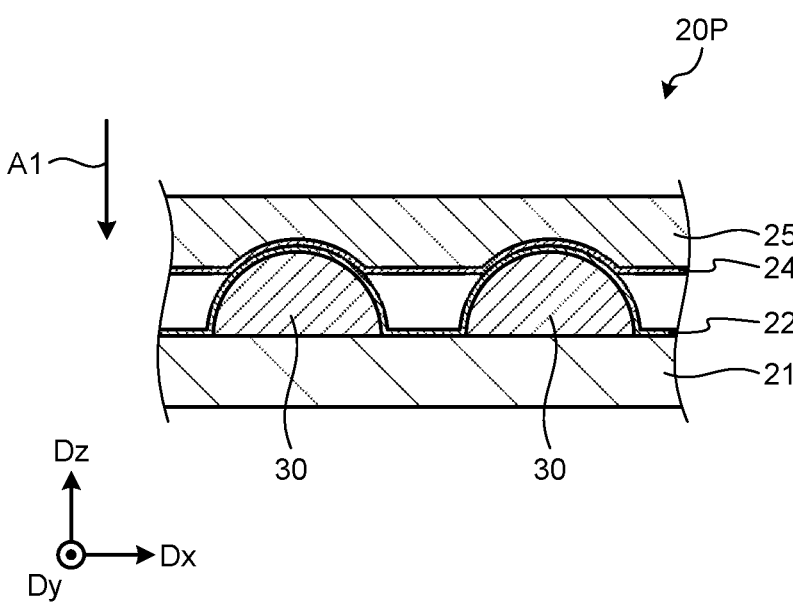
FIG. 25 is a sectional view of the force sensor according to the thirteenth modification after force is input.

FIG. 24 is a sectional view of the force sensor according to the thirteenth modification before force is input. FIG. 25 is a sectional view of the force sensor according to the thirteenth modification after force is input. As illustrated in FIG. 24, a force sensor 20P according to the thirteenth modification includes the second substrate 21, spacers 30, a detection electrode 22P, the second counter electrode 24, and the second protective layer 25.

The spacer 30 has a hemispherical shape. The spacer 30 is provided on the upper surface of the detection electrode 22 and is disposed to protrude toward the second counter electrode 24. The spacer 30 is made of more rigid material than the second protective layer 25 and is hard to deform. The spacer 30 may be made of either conductive or insulating material. The spacers 30 are arrayed in the first direction Dx and second direction Dy in a manner equally spaced.

The detection electrode 22P is formed on the second substrate 21 and the spacers 30. The part of the spacer 30 most protruding toward the second counter electrode 24 in the detection electrode 22P (hereinafter referred to as an apex 31) is in contact with the second counter electrode 24. No electric current flows to the detection electrode 22P because the contact area between the apex 31 of the detection electrode 22P and the second counter electrode 24 is minimum.

As illustrated in FIG. 24, when the force is input, the second protective layer 25 and the second counter electrode 24 move downward. Therefore, the second protective layer 25 and the second counter electrode 24 are pressed by the spacers 30 and are deformed to be recessed upward. As a result, the contact area between the detection electrode 22P and the second counter electrode 24 increases, and an electric current flows to the detection electrode 22P. As the amount of downward movement of the second counter electrode 24 increases, the contact area with the detection electrode 22P increases because the spacer 30 has a hemispherical shape. Therefore, the amount of electric current flowing to the detection electrode 22P increases.

Fourteenth Modification

Figure 26:
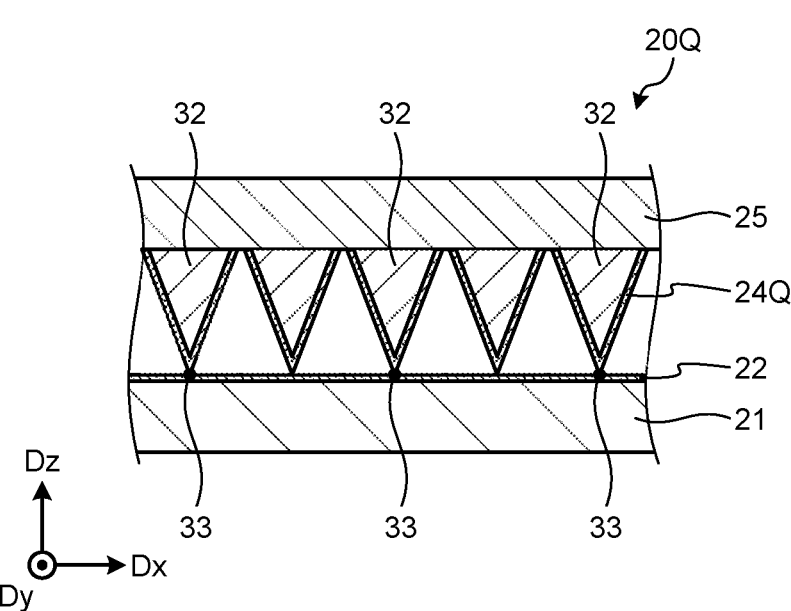
FIG. 26 is a sectional view of the force sensor according to a fourteenth modification before force is input.
Figure 27:
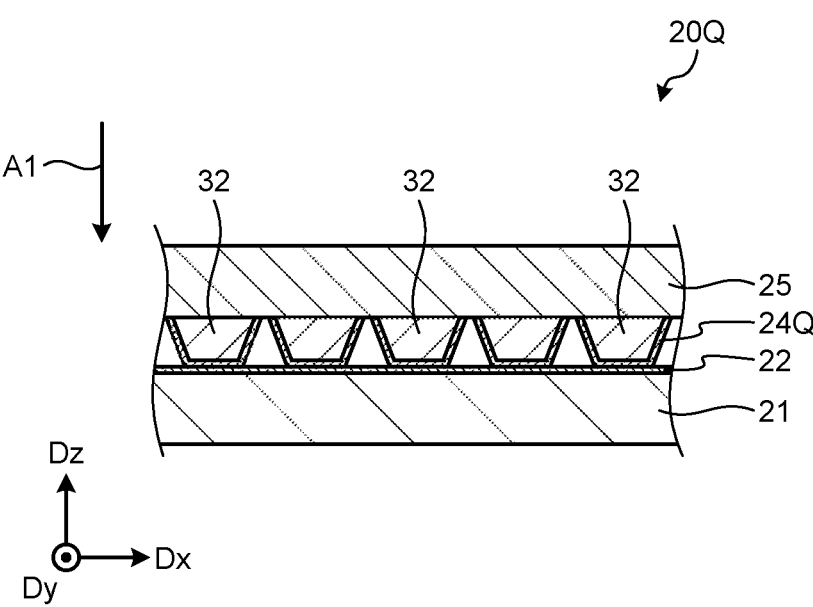
FIG. 27 is a sectional view of the force sensor according to the fourteenth modification after force is input.

FIG. 26 is a sectional view of the force sensor according to the fourteenth modification before force is input. FIG. 27 is a sectional view of the force sensor according to the fourteenth modification after force is input. As illustrated in FIG. 26, a force sensor 20Q according to the fourteenth modification includes the second substrate 21, the detection electrode 22, a second counter electrode 24Q, spacers 32, and the second protective layer 25.

The spacer 32 has a conical shape. The spacer 32 is provided on the lower surface of the second protective layer 25 and is disposed to protrude toward the detection electrode 22. The spacer 32 is made of less rigid material than the second protective layer 25 and is easily deformed. An apex 33 of the spacer 32 is in contact with the detection electrode 22. The spacers 32 are arrayed in the first direction Dx and second direction Dy in a manner equally spaced.

The second counter electrode 24Q is formed on the lower surface of the second protective layer 25 and the spacers 32. The apex 33 at the end of the spacer 32 in the second counter electrode 24Q is in contact with the detection electrode 22. No electric current flows to the detection electrode 22 because the contact area between the apex 33 of the second counter electrode 24Q and the detection electrode 22 is minimum.

As illustrated in FIG. 27, when the force is input, and the second protective layer 25 moves downward, the ends of the spacers 32 are crushed between the second protective layer 25 and the second substrate 21. As a result, the contact area between the second counter electrode 24Q and the detection electrode 22 increases, and an electric current flows to the detection electrode 22. As the force increases, the amount of crush of the ends of the spacers 32 increases, and the contact area also increases. Therefore, the amount of electric current flowing to the detection electrode 22P increases.

Fifteenth Modification

Figure 28:
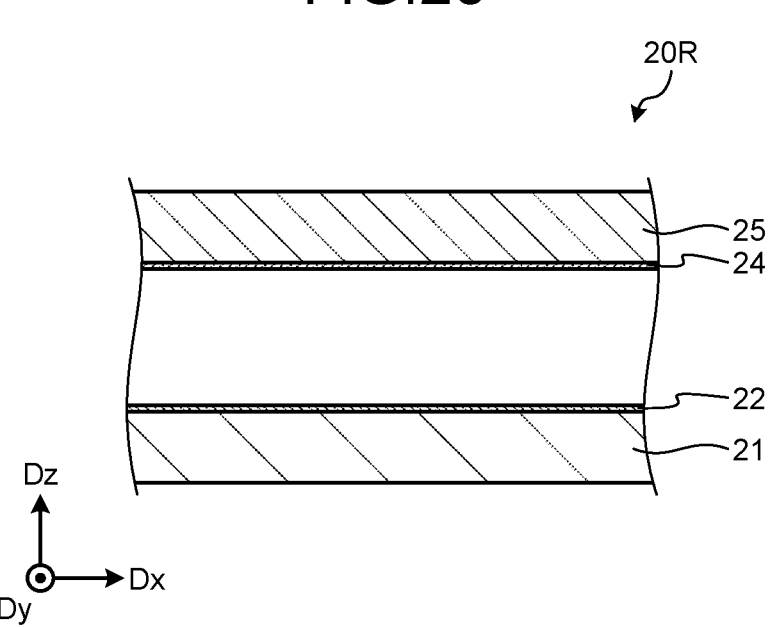
FIG. 28 is a sectional view of the force sensor according to a fifteenth modification before force is input.
Figure 29:
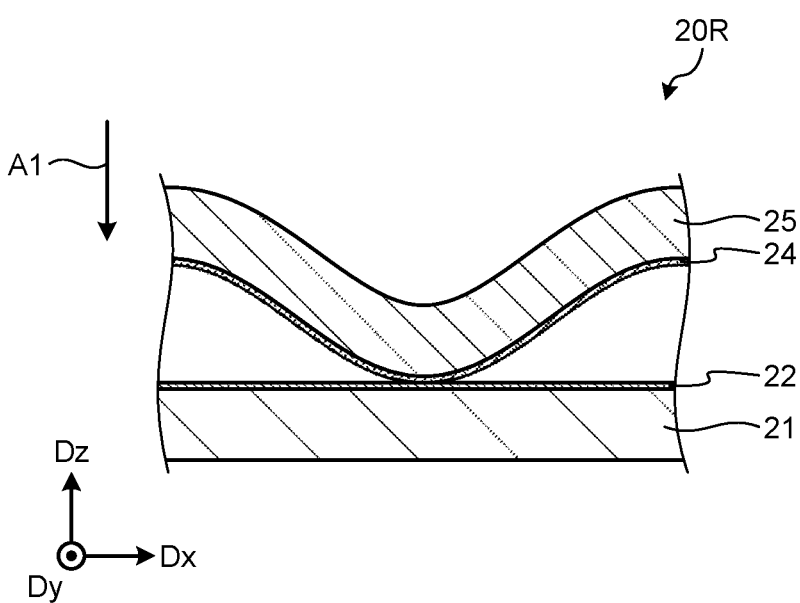
FIG. 29 is a sectional view of the force sensor according to the fifteenth modification after force is input.

FIG. 28 is a sectional view of the force sensor according to the fifteenth modification before force is input. FIG. 29 is a sectional view of the force sensor according to the fifteenth modification after force is input. As illustrated in FIG. 28, a force sensor 20R according to the fifteenth modification includes the second substrate 21, the detection electrode 22, the second counter electrode 24, and the second protective layer 25. In other words, the force sensor 20R is similar to the force sensor 20 according to the first embodiment but the second sensor layer 23 is removed therefrom.

When no force is input, the detection electrode 22 and the second counter electrode 24 are separated, and no electric current flows to the detection electrode 22. By contrast, when force is input, the second protective layer 25 and the second counter electrode 24 move in the force direction A1, and the second counter electrode 24 comes into contact with the detection electrode 22. As a result, an electric current flows to the detection electrode 22. As the force increases, and the contact area between the second counter electrode 24 and the detection electrode 22 increases, the electric current flowing to the detection electrode 22 also increases. With this configuration, the force input to the comprehensive detection region 5 can be detected.

What is claimed is:

1. A force sensor comprising:

an input surface that is pressed;

a first sensor and a second sensor stacked in order in a force direction with respect to the input surface, wherein the input surface has a detection region in which force is detected, one of the first sensor and the second sensor is a force distribution sensor having a plurality of individual detection regions dividing the detection region and configured to detect the force input to the individual detection regions, and the other of the first sensor and the second sensor is a force sensor having a comprehensive detection region overlapping at least two or more of the individual detection regions and configured to detect the force input to the comprehensive detection region; and an information processor configured to receive a detection result of the force distribution sensor and a detection result of the force sensor, wherein the information processor derives a correction coefficient from Expression 1

$$A \times \int_1^m \int_1^n p_i s_i = W \qquad (1)$$

and derives a corrected force value in the individual detection regions from Expression 2

$$p_i{}^* = A \times p_i \qquad (2)$$

where A in Expression 1 and Expression 2 is the correction coefficient, $p_i$ in Expression 1 and Expression 2 is a force value of each of the individual detection regions obtained by the force distribution sensor, $s_i$ in Expression 1 is the area of each of the individual detection regions, m in Expression 1 is number of the individual detection regions arrayed in a first direction intersecting the force direction, n in Expression 1 is number of the individual detection regions arrayed in a second direction intersecting both the force direction and the first direction, W in Expression 1 is a whole load obtained by the force sensor, and $p_i{}^*$ in Expression 2 is the corrected force value in the individual detection regions.

2. The force sensor according to claim 1, wherein the first sensor is the force distribution sensor.

3. The force sensor according to claim 1, wherein the first sensor is the force sensor.

4. The force sensor according to claim 1, wherein the first sensor and the second sensor are bonded by an adhesive layer.

5. The force sensor according to claim 1, wherein the first sensor has a bottom surface facing the force direction, the second sensor comprises:

a first electrode; and a second electrode disposed in the force direction with respect to the first electrode and opposing the first electrode, and the first electrode is provided to the bottom surface of the first sensor.

6. The force sensor according to claim 1, wherein the comprehensive detection region overlaps the entire detection region.

*   *   *   *   *